March 29, 1949.　　　R. W. LAVENDER　　　2,465,809

AMPLIFIER CONTROL CIRCUIT

Filed Oct. 18, 1946　　　　　　　　　　　　　2 Sheets-Sheet 1

Inventor:
Raymond W. Lavender,
by　*Claude A. Nott*
　His Attorney.

March 29, 1949.  R. W. LAVENDER  2,465,809
AMPLIFIER CONTROL CIRCUIT
Filed Oct. 18, 1946  2 Sheets-Sheet 2
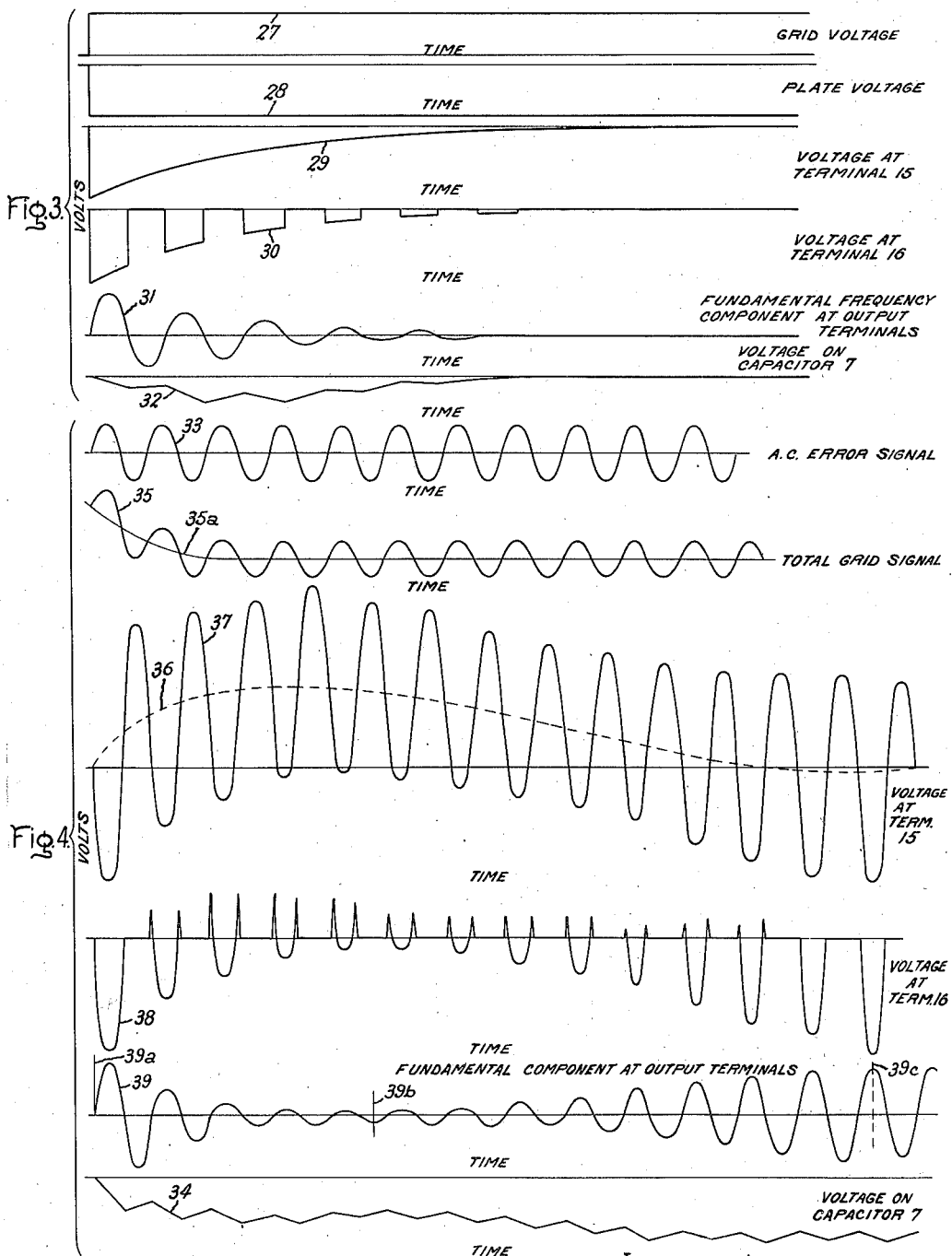
Inventor:
Raymond W. Lavender,
by  His Attorney.

Patented Mar. 29, 1949

2,465,809

UNITED STATES PATENT OFFICE 2,465,809

AMPLIFIER CONTROL CIRCUIT

Raymond W. Lavender, Johnson City, N. Y., assignor to General Electric Company, a corporation of New York Application October 18, 1946, Serial No. 704,231

3 Claims. (Cl. 179—171)

This invention relates to amplifier control circuits and it has for an object the provision of a simple, reliable and improved circuit of this character.

More particularly, the invention relates to derivative circuits and a more specific object of the invention is the provision of a circuit of this character which is not sensitive to changes in frequency.

A still more specific object of the invention is the provision of an amplifier which derives from the periodically varying input voltage a half wave voltage which is an integral plus a derivative plus a direct function of the input.

The invention is useful in stabilizing follow-up control systems of which the error signal is a periodically varying voltage.

In carrying the invention into effect in one form thereof, the alternating error voltage is supplied to a phase inverter amplifier valve. The output circuit voltage of this valve is coupled to a phase discriminator and a modulator, which converts the error voltage into a half wave direct voltage. A capacitor is connected across a voltage drop device which is connected in circuit with the discriminator, and a feedback circuit is provided from this capacitor to the input circuit of the amplifier valve.

Figure 1:
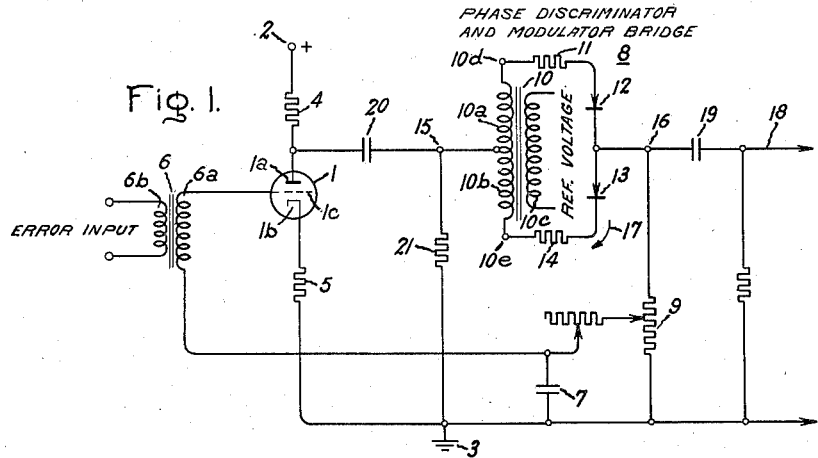
Figure 2:
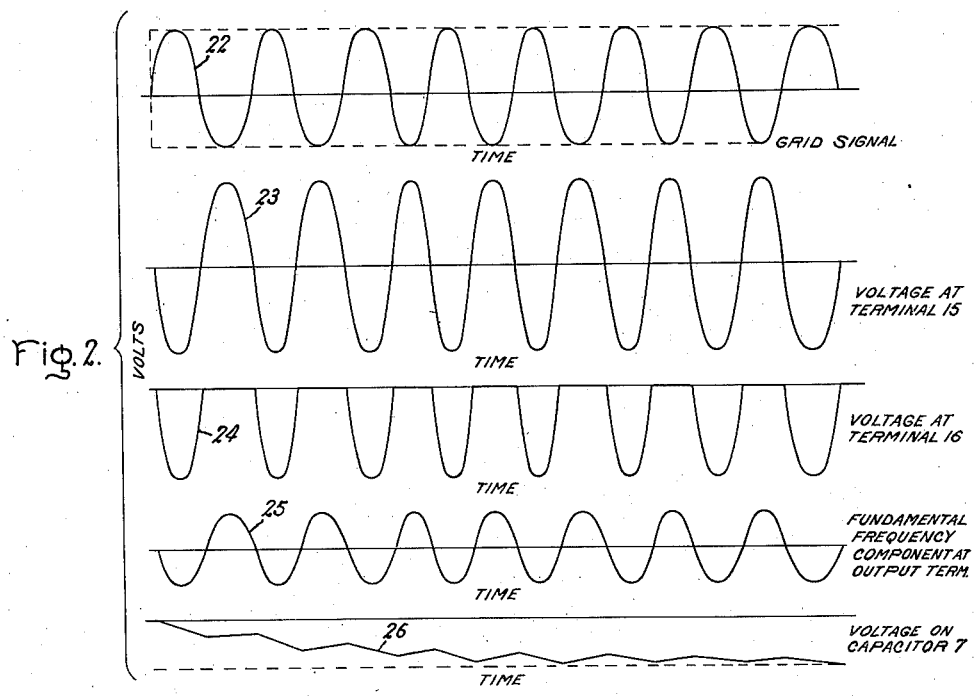

For a better and more complete understanding of the invention, reference should now be had to the following specification and to the accompanying drawing of which Fig. 1 is a simple, schematic diagram of an embodiment of the invention, and Figs. 2, 3 and 4 are charts of characteristic curves which facilitate an understanding of the invention.

Referring now to the drawing, an electric valve 1 is supplied from a source of direct voltage which is represented by the terminal 2 and ground 3. The terminal 2 is the positive supply line. As shown, the valve 1 is provided with an anode 1a, a cathode 1b, and a control grid 1c. Included in the anode circuit of the valve 1 is a voltage dropping resistor 4 and in the cathode circuit is a resistor 5.

In the input or grid cathode circuit of the valve, the secondary winding 6a of the input transformer 6 and a capacitor 7 are connected in series between the grid 1c and ground 3 to which the cathode is connected through resistor 5. To the primary winding 6b of the input circuit is supplied an alternating voltage which in the operation of a follow-up system is referred to as the error voltage.

A circuit including a phase discriminator and modulator 8 and a potentiometer resistor 9 is coupled by means of capacitor 20 and resistor 21 to the anode-cathode or output circuit of the valve 1. The resistance of potentiometer 9 is large in comparison with the resistance of resistor 21. The phase discriminator and modulator is embodied in a circular bridge circuit comprising the secondary winding of a transformer 10, resistor 11, rectifiers 12 and 13 and resistor 14. The secondary winding of the transformer is center tapped and the two halves of the winding 10a and 10b on opposite sides of the center tap constitute two of the bridge arms. The resistor 11 and rectifier 12 constitute the third arm and the resistor 14 and rectifier 13 constitute the fourth arm. Although the rectifiers may be of any suitable type they are preferably of the surface, contact type such for example as the well known copper oxide rectifier. They are similarly poled in order to provide the desired discriminator action.

The primary winding 10c of the transformer is connected to a suitable source of reference alternating voltage which has the same frequency and phase as the error voltage.

In operation the phase discriminator and modulator acts like a switch to connect the terminals 15 and 16 every other half cycle of the transformer voltage. When the transformer terminal 10d is more positive than terminal 10e a current will flow around the loop of the bridge in the direction indicated by the arrow 17. The center tap of the secondary winding of the transformer will be at the same potential as the center tap of the load circuit at terminal 16. When the terminal 10e is more positive than terminal 10d, current flow is prevented by the rectifiers 13 and 12, and the terminals 10d and 10e are isolated.

The amplifier is provided with an output circuit which is represented by the conductor 18 and ground. This output circuit is coupled by means of capacitor 19 to the phase discriminator and modulator circuit.

With the foregoing understanding of the elements and their organization, the operation of the system will readily be understood from the following description.

There is applied to the grid or input circuit of the valve 1 a signal voltage which is the sum of any voltage appearing across capacitor 7 and any voltage induced in the secondary winding 6a of the error voltage input transformer. The sum of these voltages is amplified and transmitted through the R. C. coupling 21, 20 to the input of the discriminator and modulator bridge and applied to the terminal 16 every other half cycle of the transformer voltage.

The half wave voltage across resistor 9 has a fundamental frequency alternating component, and a direct component as well as some amount of unwanted harmonic voltage. After a delay the direct component is applied to the capacitor 7 whereas the fundamental frequency is transmitted through the R. C. coupling to the output circuit.

An understanding of the detailed operation is facilitated by considering the grid of the valve 1 to be disconnected from the input circuits and to consider the operations that result when alternating voltage signals and direct voltage signals are separately applied between the grid 1c and ground.

If an alternating voltage signal such as represented by the sinusoidal curve 22 is supplied between the grid and ground it is amplified and phase inverted. The amplified voltage is represented by the curve 23 in Fig. 2. This phase inverted amplified voltage is rectified by the phase discriminator and modulator bridge and appears across the resistor 9 as a half wave voltage which is represented by the curve 24 in Fig. 2. Owing to the R. C. coupling 9, 19, an alternating voltage of fundamental frequency appears at the output terminals 18, 3. This fundamental frequency output voltage is represented by the sinusoidal curve 25 in Fig. 2. The magnitude of the fundamental frequency component is proportional to that of the signal. In addition a direct voltage gradually builds up on capacitor 7, of which the polarity and magnitude is represented by the curve 26.

If a direct voltage signal, e. g. an abrupt step of voltage, as represented by curve 27 of Fig. 3 is separately applied to the grid 1c, the valve 1 produces at its anode terminal a faithful but amplified and inverted replica as represented by curve 28 in Fig. 3. However, owing to the capacitor 20 this voltage is transmitted as a decrement or surge to the input terminal 15 of the phase discriminator and modulator. It is represented by the curve 29 in Fig. 3.

Owing to the periodic rectifying action of the phase discriminator the voltage at the output terminal 16 of the modulator, appears as a series of voltage pulses of which the envelope has the same general shape as the surge voltage 29 at the bridge input terminal 15. The voltage at the terminal 16 is represented by the curve 30. Owing to the R. C. coupling this voltage produces at the output terminals 3 and 18 a voltage of fundamental frequency and of decreasing amplitude as represented by the curve 31 in Fig. 3. The direct component of the voltage at the output terminal 16 of the phase discriminator is applied to the capacitor 7 and the voltage across the capacitor builds up at first and then decays in a manner which is illustrated by the curve 32.

In the complete circuit, i. e., with the grid 1c of the valve connected to the signal input circuit, both of the operations described in the foregoing are taking place simultaneously, for an alternating error voltage applied to the terminals of the primary winding of the error input transformer 6 soon produces a direct component on capacitor 7, and a direct component on the capacitor produces an alternating output which opposes the effect of the original alternating voltage signal.

For example, consider that an alternating error signal voltage of constant magnitude such as represented by curve 33 of Fig. 4 is suddenly applied to the input terminals of the error input transformer 6. The direct component of voltage of negative polarity which builds up on the capacitor 7 as represented by curve 34 is applied to the grid 1c. The total signal voltage applied to the grid is represented by the sinusoidal curve 35 of which the axis has the same general form as the median line of the curve 34.

The direct voltage which builds up on the capacitor 7 and which is applied to the grid 1c as a component of the total signal is amplified, phase inverted and passed as a surge through coupling capacitor 20 to the discriminator and modulator input terminal 15. This phase inverted surge voltage is indicated by the dotted curve 36 in Fig. 4. Similarly the alternating component of the signal voltage is phase inverted, amplified and transmitted to the discriminator input terminal, so that the total voltage appearing at the terminal 15 is represented by the sinusoidal curve 37.

At the output terminal 16 of the discriminator there appears a half wave voltage, the characteristics of which are represented by the curve 38 in Fig. 4. This rectified and modulated voltage after passing through the R. C. coupling 9, 19 appears at the output terminals 3 and 18 as an alternating voltage of fundamental frequency as indicated by the sinusoidal curve 39. The magnitude of the direct component of the grid signal voltage is such that the magnitude of the voltage at the output terminals 3 and 18 is; at first, reduced as indicated by the diminishing amplitude of the alternations of the curve 39 between the points 39a and 39b. As time proceeds, as indicated by the succession of cycles, the direct component voltage on the capacitor 7 tends to remain constant or decrease slightly, and consequently the direct component voltage across the resistor 9 tends to decrease owing to the R. C. coupling 20, 21. This is indicated by the approach of curve 36 to the axis. It results in an increase in the magnitude of the fundamental frequency voltage as represented by the increasing amplitude of the alternations of the curve 39 between points 39b and 39c.

Finally the steady state condition is reached in which capacitor 20 blocks any direct voltage from passing through to the discriminator modulator bridge and the original amplitude fundamental frequency voltage at the output terminals is restored.

In the operation described in the foregoing the voltage fed back by the capacitor 7 to the input circuit is a first derivative function of the voltage at the terminal 16. The capacitor 20 supplies a voltage to the input of the modulator which is an integral function of the signal voltage.

Thus the output voltage 39 contains an integral function plus a derivative function plus a direct function. Although in accordance with the provisions of the patent statutes this invention is described as embodied in concrete form and the principle thereof has been explained together with the best mode in which it is now contemplated applying that principle, it will be understood that the apparatus shown and described is merely illustrative and that the invention is not limited thereto since alterations and modifications will readily suggest themselves to persons skilled in the art without departing from the true spirit of the invention or from the scope of the annexed claims.

What I claim as new and desire to secure by Letters Patent of the United States, is:

1. An amplifier comprising an electric valve provided with an anode-cathode circuit and a control grid input circuit, means for supplying to said grid circuit a periodically varying voltage, a third circuit having a resistance-capacitance coupling to said anode-cathode circuit, a phase discriminator and modulator bridge and a voltage drop device connected in said third circuit, said bridge comprising a transformer having a primary winding energized with a periodically varying reference voltage having the same frequency and phase as said input circuit voltage and a secondary winding constituting two arms of said bridge, an output circuit, a capacitative coupling for supplying the alternating component of the voltage transmitted by said bridge to said output circuit, a capacitor connected in parallel with said voltage drop device to be charged by the direct component of the voltage transmitted by said bridge and a feedback circuit from said capacitor to said input circuit.

2. An amplifier comprising an electric valve provided with an anode-cathode circuit and a control grid input circuit, means for supplying to said grid circuit a periodically varying voltage, a periodically varying reference voltage having the same frequency and phase as said grid circuit voltage, a third circuit having a resistance capacitance coupling to said anode-cathode circuit and including a phase discriminator and modulator device energized from said reference voltage for rectifying said anode-cathode circuit voltage and a voltage drop device connected in circuit with said discriminator device, a capacitor connected in parallel with said voltage drop device to be charged by said rectified voltage, a feedback circuit from said capacitor to said grid input circuit, an output circuit, and a capacitance coupling said third circuit to said output circuit for transmitting the alternating component of said rectified voltage to said output circuit.

3. An amplifier comprising an electric valve provided with an anode-cathode circuit and a control grid input circuit, means for supplying to said grid circuit a periodically varying voltage, means for rectifying the voltage of the anode-cathode circuit comprising a phase discriminator and modulator bridge comprising a transformer having a secondary winding constituting two arms of the bridge and a primary winding, means for supplying to said primary winding a periodically varying voltage having the same frequency and phase as said grid voltage, a third circuit comprising said secondary winding and a voltage drop device having a resistance capacitance coupling to said anode-cathode circuit, a capacitor connected in parallel with said voltage drop device to be charged by said rectified voltage, a feedback circuit from said capacitor to said grid circuit and an output circuit having a capacitance coupling to said third circuit.

RAYMOND W. LAVENDER.

REFERENCES CITED

The following references are of record in the file of this patent:

UNITED STATES PATENTS

| Number | Name | Date |
| --- | --- | --- |
| 2,398,025 | Campbell | Nov. 13, 1945 |
| 2,399,675 | Hays, Jr. | May 7, 1946 |